United States Patent [19]

Miyasaka

[11] Patent Number: 5,614,968
[45] Date of Patent: Mar. 25, 1997

[54] CAMERA AND PRINTER SYSTEM

[75] Inventor: Tetsuo Miyasaka, Kanagawa-ken, Japan

[73] Assignee: Olympus Optical Co., Ltd., Tokyo, Japan

[21] Appl. No.: 550,222

[22] Filed: Oct. 30, 1995

Related U.S. Application Data

[63] Continuation of Ser. No. 327,221, Oct. 21, 1994, abandoned, which is a continuation of Ser. No. 88,836, Jul. 8, 1993, abandoned.

[30] Foreign Application Priority Data

Jul. 10, 1992 [JP] Japan .................................... 4-183532

[51] Int. Cl.⁶ .................................................. G03B 17/24
[52] U.S. Cl. .......................................... 396/311; 396/319
[58] Field of Search ................................. 354/105, 106, 354/109, 76, 288; 355/55

[56] References Cited

U.S. PATENT DOCUMENTS

| | | | |
|---|---|---|---|
| 4,943,825 | 7/1990 | Taniguchi et al. | 354/106 X |
| 4,972,213 | 11/1990 | Stoneham et al. | 354/21 |
| 5,101,303 | 3/1992 | Maeda et al. | 360/75 |
| 5,126,775 | 6/1992 | Nakai et al. | 354/288 |
| 5,132,715 | 7/1992 | Taillie | 354/105 |
| 5,140,353 | 8/1992 | Stoneham | 354/105 |
| 5,151,726 | 9/1992 | Iwashita et al. | 354/106 X |
| 5,170,198 | 12/1992 | Cannon | 354/105 |
| 5,181,058 | 1/1993 | Egawa | 354/105 |
| 5,204,707 | 4/1993 | Harvey | 354/106 X |
| 5,272,498 | 12/1993 | Wakabayashi | 354/105 |
| 5,353,077 | 10/1994 | Tanaka et al. | 354/94 |

FOREIGN PATENT DOCUMENTS 62-50743  3/1987  Japan .

*Primary Examiner*—Safet Metjahic
*Assistant Examiner*—Nicholas J. Tuccillo
*Attorney, Agent, or Firm*—Frishauf, Holtz, Goodman, Langer & Chick

[57] ABSTRACT

A camera system comprises by a camera main body and a film loaded in the camera main body and having a magnetic recording portion. Data for commanding a printer apparatus to perform trimming exposure is recorded on the magnetic recording portion of the film in advance. A feed mechanism feeds the film. A manual operation member is arranged on the outer surface of the camera main body. In the camera main body, a permanent magnet moves, upon manual operation of the manual operation member, between a position where the magnet opposes the magnetic recording portion of the film and a position to which the magnet is caused to retreat from the magnetic recording portion. When a film feed operation is performed by the feed mechanism while the permanent magnet is set at the position where it opposes the magnetic recording portion, the permanent magnet erases the trimming command data recorded on the magnetic recording portion, thereby prohibiting the printer apparatus from performing trimming exposure.

6 Claims, 8 Drawing Sheets

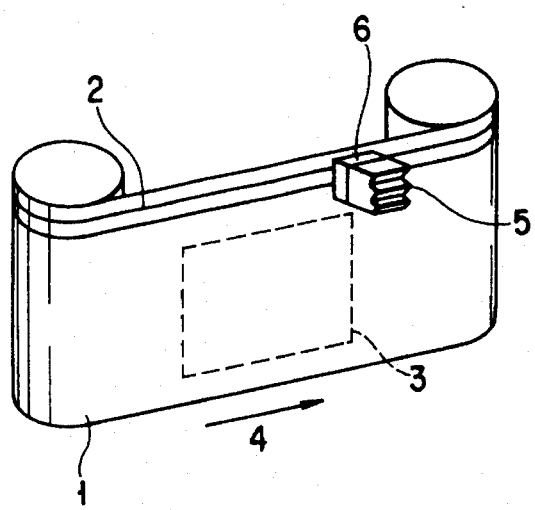
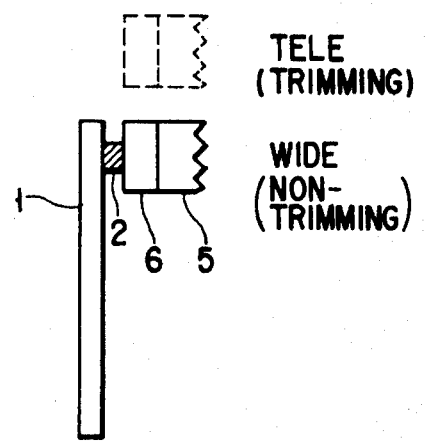
F I G. 1   F I G. 2
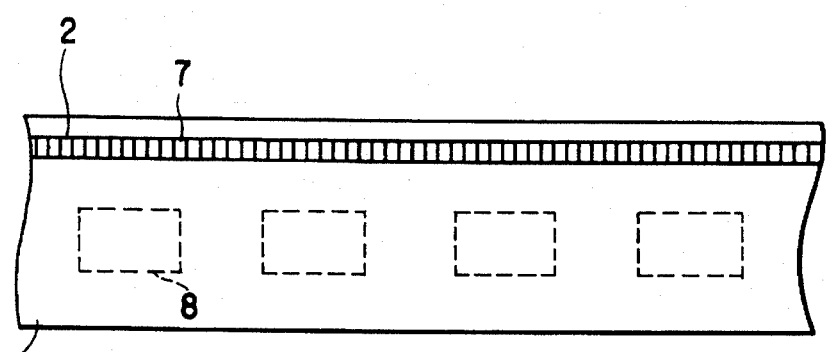
F I G. 3A
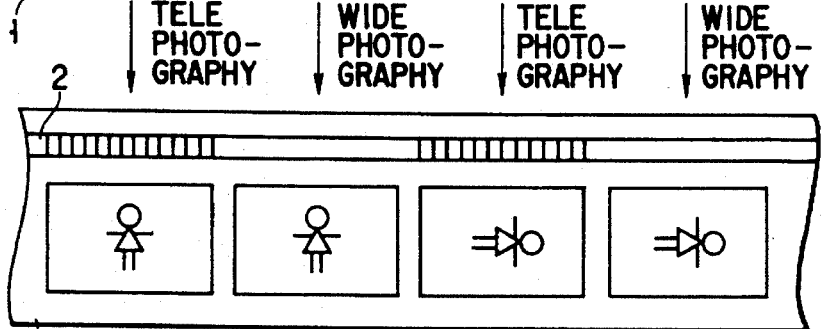
F I G. 3B
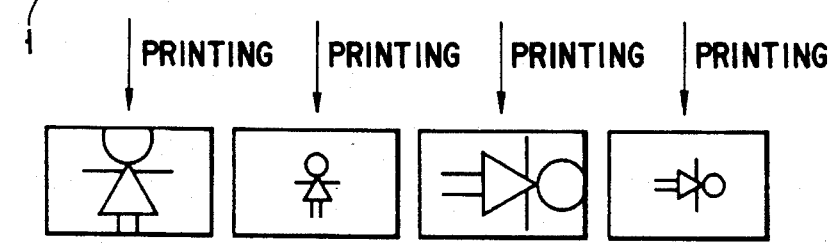
F I G. 3C

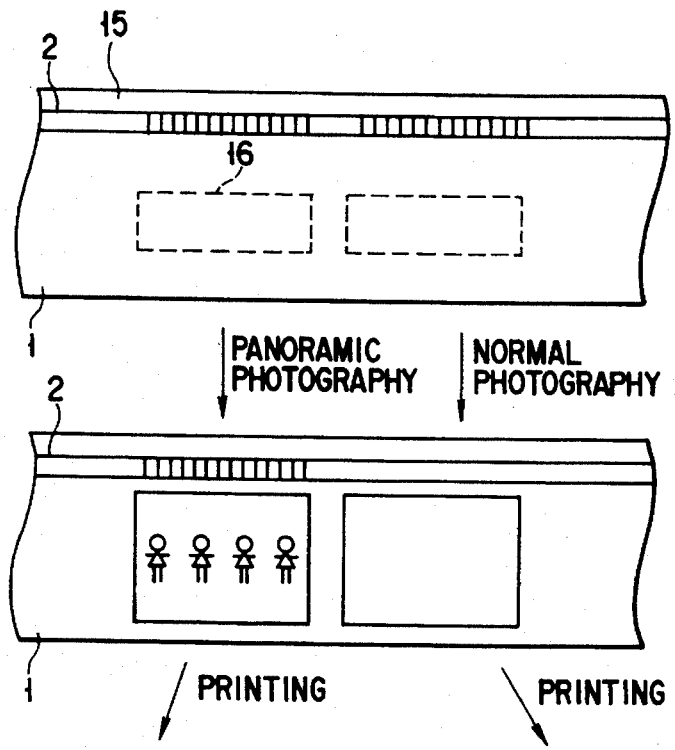
FIG. 6A
FIG. 6B
FIG. 6C
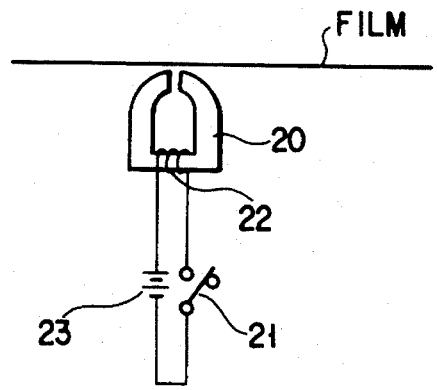
FIG. 7
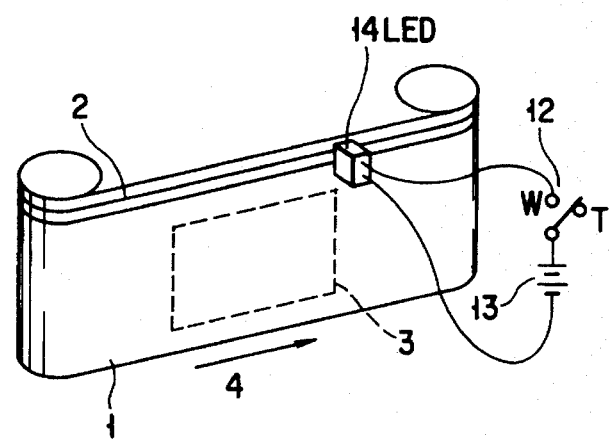
FIG. 8

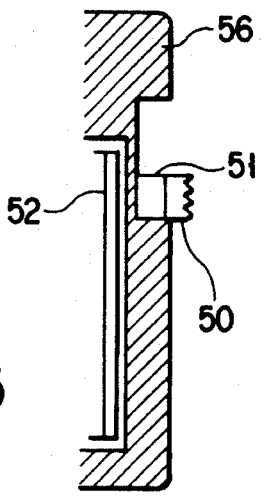
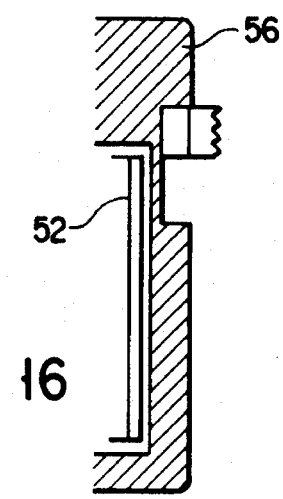
FIG. 15    FIG. 16
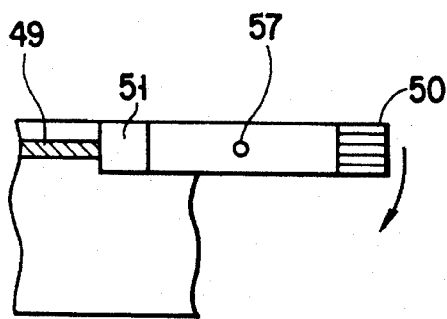
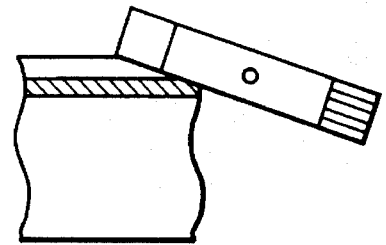
FIG. 17    FIG. 18
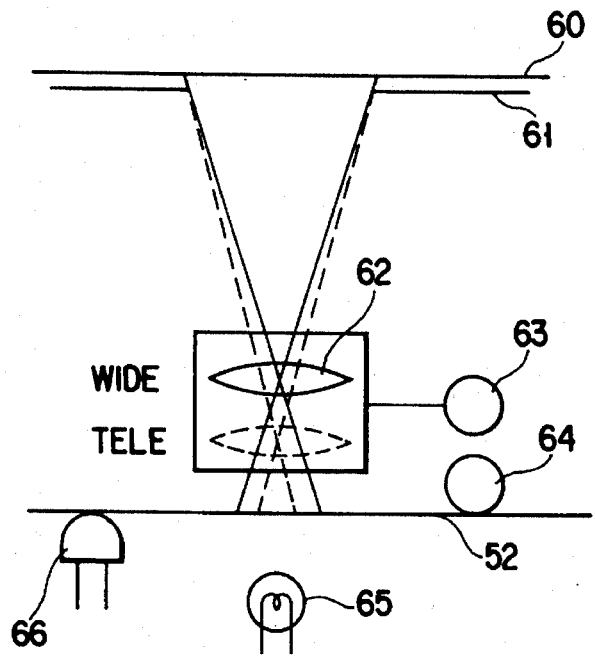
FIG. 19

CAMERA AND PRINTER SYSTEM

This application is a Continuation of application Ser. No. 08/327,221, filed Oct. 21, 1994, now abandoned which is a Continuation of Ser. No. 08/088,836, filed Jul. 8, 1993 (now abandoned).

BACKGROUND OF THE INVENTION

1. Field of the Invention

The present invention relates to a camera system using a film in which photographic data is written in advance and, more particularly, to a trimming camera for performing photography by using a single-focal-length lens and changing the enlarging magnification in a printing operation.

2. Description of the Related Art

Conventional techniques associated with trimming cameras have been proposed. Such a camera uses a film on which trimming data or the like is recorded in advance.

For example, Published Unexamined Japanese Patent Application No. 62-50743 discloses a technique associated with a trimming camera in which data such as date data and trimming data are coded and are imprinted, as dots, in a film by using a plurality of LEDs (light emitting diodes).

U.S. Pat. No. 4,972,213 discloses a technique associated with a trimming camera in which a magnetic coating is formed on the surface of a film, and date data, trimming data, and the like are magnetically recorded on the film.

Recently, panorama cameras and cameras incorporating films have been widely used. A panorama camera allows printing of a horizontally oblong picture by photographing a horizontally oblong frame about half the size of a normal frame. A camera incorporating a film is a camera in which a film is loaded in advance.

In the above-described techniques of optically and magnetically writing trimming data in films, although various trimming data can be written, a complicated, expensive circuit is required to write data.

More specifically, in the technique disclosed in Published Unexamined Japanese Patent Application No. 62-50743, an LED, a CPU (Central Processing Unit), and the like are required for a camera. In the technique disclosed in U.S. Pat. No. 4,972,213, a write head, a CPU, and the like are required for a camera. It is difficult to mount such components in a camera such as the above-mentioned camera incorporating a film, which is required to be inexpensive and compact.

When, for example, "TELE/WIDE" switching or "NORMAL/PANORAMIC" switching is to be easily performed by using only trimming data, a similar circuit needs to be mounted in a camera, resulting in difficulty in realizing an inexpensive, compact camera.

SUMMARY OF THE INVENTION

The present invention has been made to solve the above-described problem, and has as its object to provide a trimming camera which can perform "TELE/WIDE" switching and "NORMAL/PANORAMIC" switching corresponding to "TRIMMING/NON-TRIMMING" switching with a very simple, compact, inexpensive arrangement.

According to the camera system of the present invention, the switching means selects the normal mode in which the normal region of a photographic film is used, and the trimming mode in which a region smaller than the normal region is used. The erase control means erases the pre-written trimming data when the trimming mode is not selected, and prohibits the erasing means from erasing the trimming data when the trimming mode is selected. In a printing operation, a predetermined region of the film is enlarged and exposed onto print paper on the basis of the trimming data, thereby obtaining a desired photograph.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a perspective view showing the arrangement of a trimming camera according to the first embodiment of the present invention;

FIG. 2 is a view for explaining a mode switching operation of the trimming camera of the first embodiment;

FIG. 3A is a plan view showing a state wherein trimming data 7 is written in a trimming data track 2 of a film 1 in advance;

FIG. 3B is a plan view showing the state of the film 1 in a case wherein photography is performed upon alternately selecting a "TELE MODE" and a "WIDE MODE";

FIG. 3C is a plan view showing print paper on which pictures are actually printed from the film 1;

FIG. 6A is a plan view showing the film 1 before photography;

FIG. 6B is a plan view showing the state of the film 1 after photography is performed in a "PANORAMIC MODE" and a "NORMAL MODE";

FIG. 6C is a plan view showing print paper on which pictures are printed from the film 1 shown in FIG. 6B;

FIG. 7 is a view showing the detailed arrangement of a magnetic head;

FIG. 8 is a perspective view showing the arrangement of a trimming camera using a film in which trimming data associated with "TELE/WIDE" switching is optically imprinted;

FIG. 15 is a view showing the state of an erase magnet 51 arranged outside a light-shielding case 56;

FIG. 16 is a view showing a position to which a magnet is caused to retreat by sliding a trimming operation member 50, at which position magnetic data is not erased;

FIG. 17 is a view showing a state wherein the trimming operation member 50 is slid/rotated about the center of a rotating shaft 57 to cause a magnet 51 to retreat from a magnetic track 49;

FIG. 18 is a view showing a position to which the magnet 51 is caused to retreat from the magnetic track 49 by sliding the trimming operation member 50 downward;

FIG. 19 is a view showing a state wherein a zoom lens 62 for exposure is set to an arbitrary focal length by a zoom motor 63.

DETAILED DESCRIPTION OF THE PREFERRED EMBODIMENTS

Figure 4:
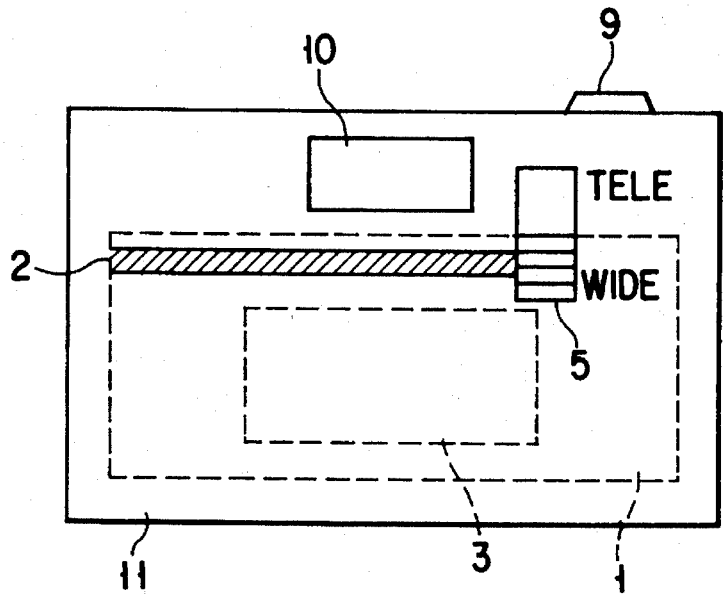
FIG. 4 is a rear view of the trimming camera of the first embodiment.

A trimming camera of the present invention will be briefly described first.

The trimming camera of the present invention uses a film in which trimming data is written in advance. When trimming is performed, the trimming data is not erased. When trimming is not performed, i.e., a normal photographic operation is performed, the trimming data is erased. With this operation, switching between "TRIMMING PHOTOGRAPHY" and "NON-TRIMMING PHOTOGRAPHY" can be performed. This switching operation is performed upon an operation of a setting section for "TELE/WIDE" or the like arranged in the camera. If, for example, the trimming data written in advance is data for printing a region smaller than an entire photographed frame, "TRIMMING PHOTOGRAPHY" and "NON-TRIMMING PHOTOGRAPHY" of a setting section correspond to "TELE PHOTOGRAPHY" and "WIDE PHOTOGRAPHY", respectively.

The present invention will be briefly described next with reference to FIGS. 3A to 3C.

As shown in FIG. 3A, trimming data 7 for a trimming size 8 indicated by a broken line is written in a trimming data track 2 of a film 1.

FIG. 3B shows the state of the film 1 in a case wherein photography is performed while a "TELE MODE" and a "WIDE MODE" are alternately selected when photography is performed upon selecting the "TELE MODE", the trimming data 7 written in advance is left without being erased. When photography is performed upon selecting the "WIDE MODE", the trimming data 7 is erased.

FIG. 3C shows the state of print paper on which pictures are actually printed from the film 1. The picture of a frame with the trimming data 7 is enlarged and printed within the area enclosed with a broken line in FIG. 3A. The picture of a frame without the trimming data 7 is completely printed. That is, a frame with trimming data is equivalent to a frame obtained by "TELE PHOTOGRAPHY"; and a frame without trimming data, a frame obtained by "WIDE PHOTOGRAPHY". Furthermore, printing is performed in accordance with "TELE/WIDE" switching performed on the camera side.

An embodiment of the present invention will be described in detail below with reference to the accompanying drawings.

As the first embodiment, a trimming camera using a film in which trimming data for enlarging/printing a predetermined region smaller than an entire frame is magnetically written will be described first.

FIG. 1 shows the arrangement of the trimming camera according to the first embodiment.

Referring to FIG. 1, a film 1 has a trimming data magnetic track 2 formed on its upper end portion. Trimming data is magnetically written in the trimming data magnetic track 2 in advance. This trimming data is digital data for designating a trimming size. A trimming switching lever 5 is arranged on the camera side. A permanent magnet 6 is mounted on a distal end portion of the trimming switching lever 5, which is brought into contact with the trimming data magnetic track 2.

As shown in FIG. 2, the trimming switching lever 5 is vertically moved in accordance with a trimming switching operation. More specifically, the trimming switching lever 5 is moved upward to set the "TELE MODE" and is moved downward to set the "WIDE MODE". That is, in the "TELE MODE", the permanent magnet 6 is not brought into contact with the trimming data magnetic track 2. In the "WIDE MODE", the permanent magnet 6 is brought into contact with the trimming data magnetic track 2. Therefore, when the film 1 is fed in a feed direction 4 indicated in FIG. 1, the trimming data is left without being erased in the "TELE MODE" but is erased in the "WIDE MODE".

FIG. 4 shows the outer appearance of the camera having the above-described trimming switching lever 5, when viewed from the rear side of the camera. As shown in FIG. 4, this camera incorporates a film wind-up motor and a power supply. The camera includes no operation member for winding up the film 1. If, however, the present invention is applied to the above-mentioned "camera incorporating a film", a film wind-up member may be arranged on the camera. In addition, the magnification or field of view of a finder 10 may be changed upon an operation of the trimming switching lever 5.

A trimming camera according to the second embodiment of the present invention will be described next.

Figure 5:
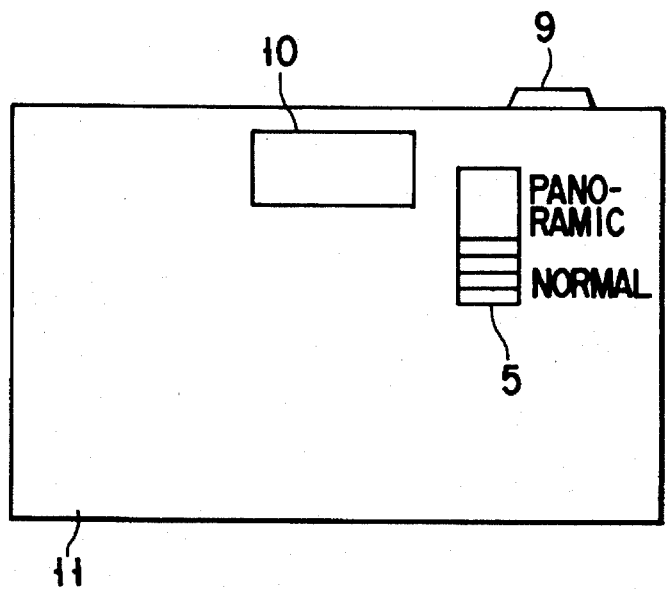
FIG. 5 is a view showing the outer appearance of the trimming camera using a film in which trimming data for printing a horizontally oblong region about half the size of an entire frame is magnetically written.

FIG. 5 shows the outer appearance of the trimming camera using a film in which trimming data for printing a horizontally oblong region about half the size of an entire frame is magnetically written.

Referring to FIG. 5, "PANORAMIC/NORMAL" switching is performed by using a trimming switching lever 5. A permanent magnet is mounted on a distal end portion of the lever 5, similar to the lever shown in FIG. 2. In this case, when a "PANORAMIC MODE" is set, the permanent magnet is not brought into contact with the magnetic track. When a "NORMAL MODE" is set, the permanent magnet is brought into contact with the magnetic track. Therefore, when the film is fed after photography, the trimming data is left without being erased in the "PANORAMIC MODE" but is erased in the "NORMAL MODE".

FIGS. 6A to 6C show the process of printing on the basis of trimming data written in a film 1.

FIG. 6A shows the film 1 before photography. Assume that panoramic data 15 indicating the "PANORAMIC MODE" is digitally written in the film 1. FIG. 6B shows the states of the film 1 after photography is performed in the "PANORAMIC MODE" and the "NORMAL MODE". FIG. 6C shows print paper on which pictures are printed from the film 1 shown in FIG. 6B.

As described above, in both the first and second embodiments, the lever 5 is moved in the vertical direction, i.e., a direction along the plane of the trimming data magnetic track 2, to erase the trimming data. However, the camera may have a lever which is moved in a direction perpendicular to the trimming data magnetic track 2. In both the first and second embodiments, trimming data is erased by the permanent magnet 6. If, however, the camera incorporates a power supply, data may be electrically erased by using a magnetic head designed to generate a magnetic field upon reception of a current.

FIG. 7 shows this magnetic head 20. The magnetic head 20 is always in contact with the trimming data magnetic track 2 on the film 1. A switch 21 is turned on only when trimming data is to be erased. When the switch 21 is turned on, a current is supplied to a coil 22 to erase trimming data. Therefore, a setting member for "TELE/WIDE" switching or "PANORAMIC/NORMAL" switching need not be a lever and may be arranged at any position.

In the trimming camera of the present invention, the magnetic head 20 may perform only an erasing operation and need not be used to write new trimming data, unlike the prior art. Therefore, a simple, inexpensive circuit can be realized.

A trimming camera according to the third embodiment of the present invention will be described next.

FIG. 8 shows the arrangement of the trimming camera using a film on which trimming data associated with a "TELE/WIDE" mode is optically imprinted in advance.

In general, since a film 1 is a photosensitive member, data can be imprinted in advance without performing special processing, unlike a magnetic track. Conventionally, data such as the name of the manufacturer, the film speed, and the frame count are imprinted on a film. When magnetic data is written, the magnetism can be erased afterward. In contrast to this, new data cannot be imprinted on optically imprinted data. However, all the imprinted data can be destroyed by causing an LED or the like to emit light. This function of "destruction" corresponds to the function of "erasing" described above.

Referring to FIG. 8, an LED 14 serves to destroy trimming data imprinted in advance. When a trimming switch 12 is set to the "WIDE" side, the LED 14 emits light. If the film 1 is fed in this state, the trimming data imprinted in advance is destroyed. When the trimming switch 12 is set to the "TELE" side, the LED 14 emits no light, and the trimming data is left without being destroyed.

Figure 9A:
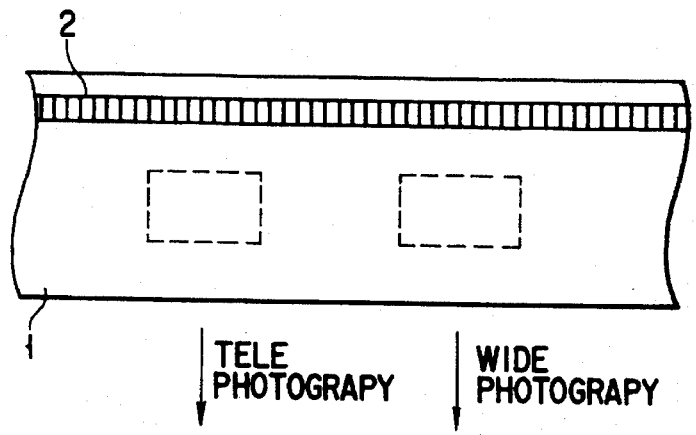
FIG. 9A is a plan view showing the state of a film 1 before photography.
Figure 9B:
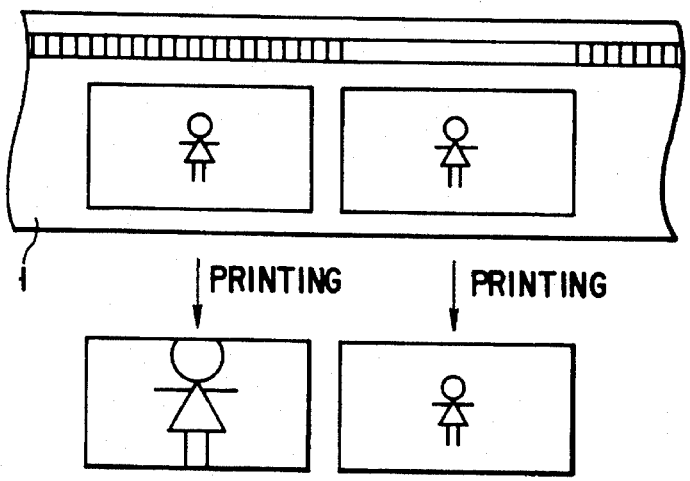
FIG. 9B is a plan view showing the state of the film 1 after photography is performed in a "TELE MODE" and a "WIDE MODE"
Figure 9C:
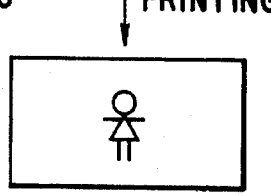
FIG. 9C is a plan view showing print paper on which pictures are printed on the basis of trimming data after the film 1 is developed.

FIGS. 9A to 9C show the process of printing pictures on the basis of data written in the film 1.

FIG. 9A shows the state of the film 1 before photography. A portion enclosed with a broken line indicates a trimming size, similar to FIG. 1A. FIG. 9B shows the state of the film 1 after photography is performed in the "TELE MODE" and the "WIDE MODE". When photography is performed in the "WIDE MODE", the LED 14 emits light to destroy the trimming imprinted in advance. FIG. 9C shows print paper on which pictures are printed on the basis of the trimming data after the film 1 is developed. In this case, printing is performed in accordance with "TELE/WIDE" switching during photography.

If a film having trimming data optically imprinted thereon is used in this manner, the presence/absence of the trimming data can be visually determined. Therefore, trimming processing can be performed without using a printer (to be described later) designed to automatically perform trimming in accordance with trimming data. Note that "PANORAMIC/NORMAL" switching can be performed by using a film on which trimming data associated with the "PANORAMIC" mode is imprinted in advance, in the same manner as described above. That is, the LED 14 is not caused to emit light in the "PANORAMIC MODE" but is caused to emit light in the "NORMAL MODE". A light source for destroying data is not limited to an LED. For example, a light bulb or an electronic flash may be used. Alternatively, field light may be received by using an opening/closing member.

Figure 10:
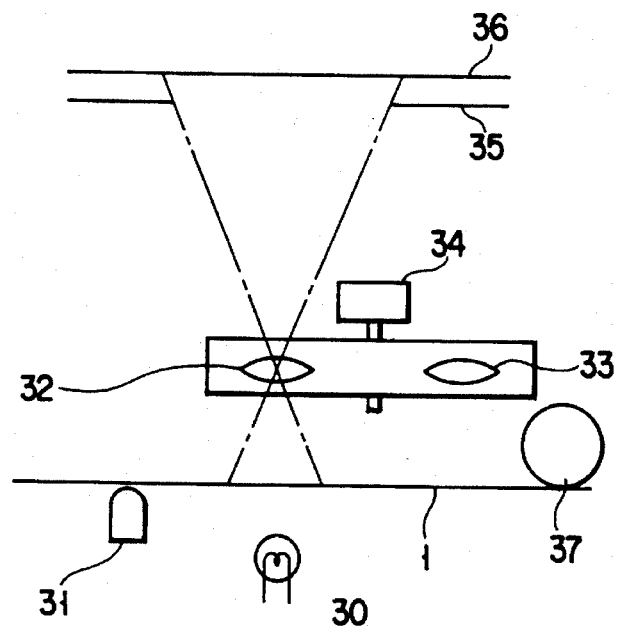
FIG. 10 is a view showing the arrangement of a printer for changing the trimming region and the magnification in accordance with trimming data associated with "TELE/ WIDE" switching, and performing exposure with respect to print paper.

FIG. 10 shows the arrangement of a printer for reading trimming data associated with a "TELE/WIDE" switching operation from a film which has undergone photography in the embodiment described above, and performing exposure on print paper upon changing the trimming region and the magnification in accordance with the trimming data. Referring to FIG. 10, a read head 31 reads trimming data on the film 1. In this printer, a reproducing magnetic head is used to handle the film 1 having magnetic data, and a photoelectric conversion element such as a photodiode is used to handle the film 1 having data optically imprinted thereon.

An exposing operation of the printer will be described below with reference to the flow chart shown in FIG. 11.

Prior to an exposing operation, a film feed motor 37 is driven to start a film feed operation (step S101). Until the film is fed by a predetermined length, the trimming data of a frame to be exposed is read by the read head 31 (step S102). When the film is fed by the predetermined length, the film feed operation is stopped (step S103).

It is checked whether the trimming data is present (step S104). If the trimming data is present, a lens switching motor 34 is driven to select a telephoto lens 32 (step S105). If no trimming data is present, i.e., no trimming data is read, the lens switching motor 34 is driven to select a wide-angle lens 33 (step S106). The wide-angle lens 33 is a lens having a magnification at which an entire photographed frame can be exposed to print paper.

Subsequently, an exposure light source 30 is caused to emit light to expose an image, formed on the film 1, onto print paper 36 (step S107). The print paper 36 is then fed (step S108), and the flow returns to step S101.

Exposure is performed with respect to the print paper 36 while the trimming magnification is changed in accordance with trimming data on the film 1 in the above-described manner. Note that a printer using a film in which trimming data associated with "PANORAMA/NORMAL" switching is written may be designed to change the magnification of an exposure lens, the width of a mask 35 formed on the entire surface of print paper, and the feed length of the print paper 36 in accordance with the trimming data.

Figure 11:
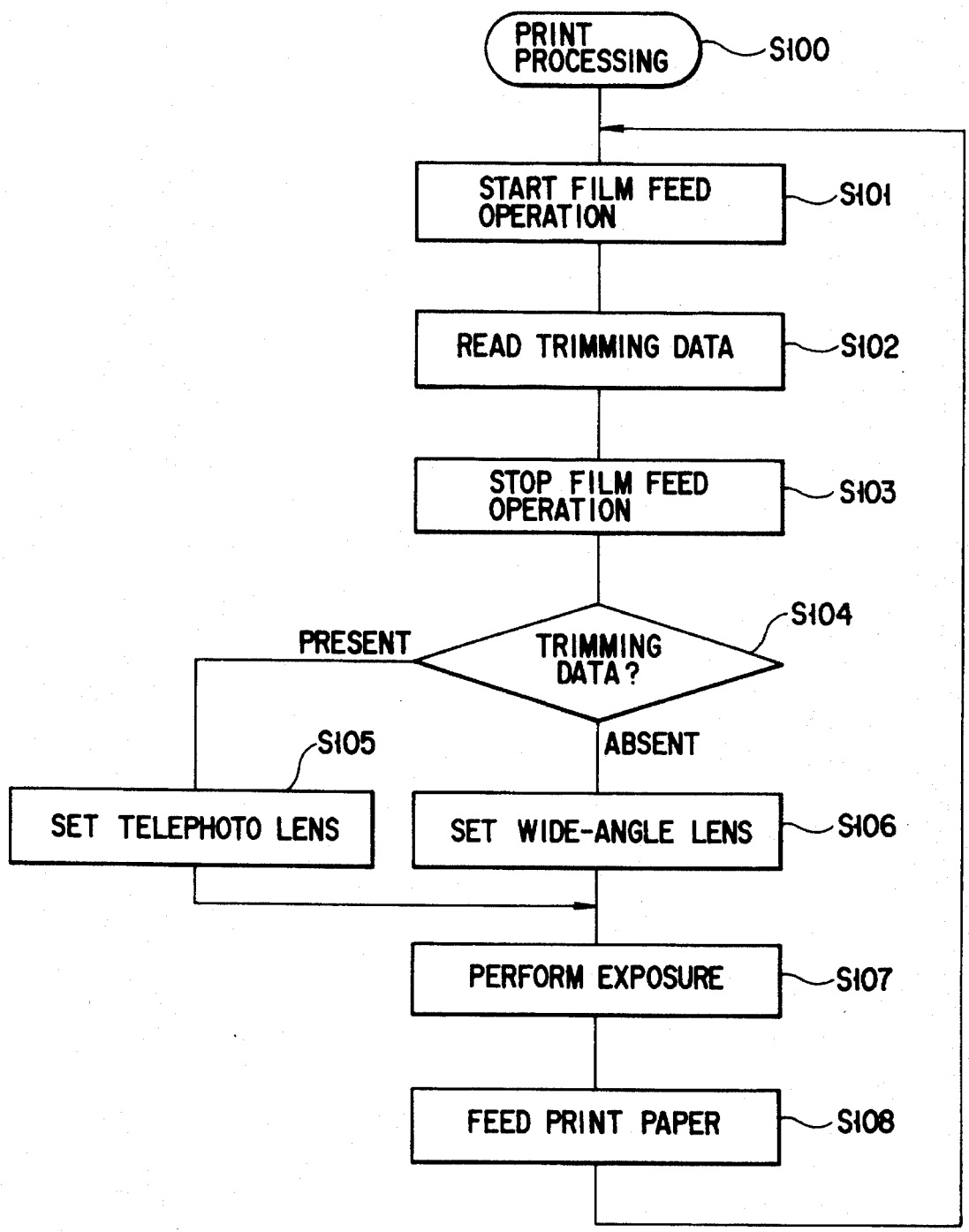
FIG. 11 is a flow chart for explaining an exposing operation of the printer.

If a flow chart associated with processing to be performed by a printer is set as shown in FIG. 11, compatibility with conventional films can be ensured, and the required operation is facilitated, because all the frames of a film having no magnetic track and no optical track are exposed by a wide-angle lens.

Figure 12:
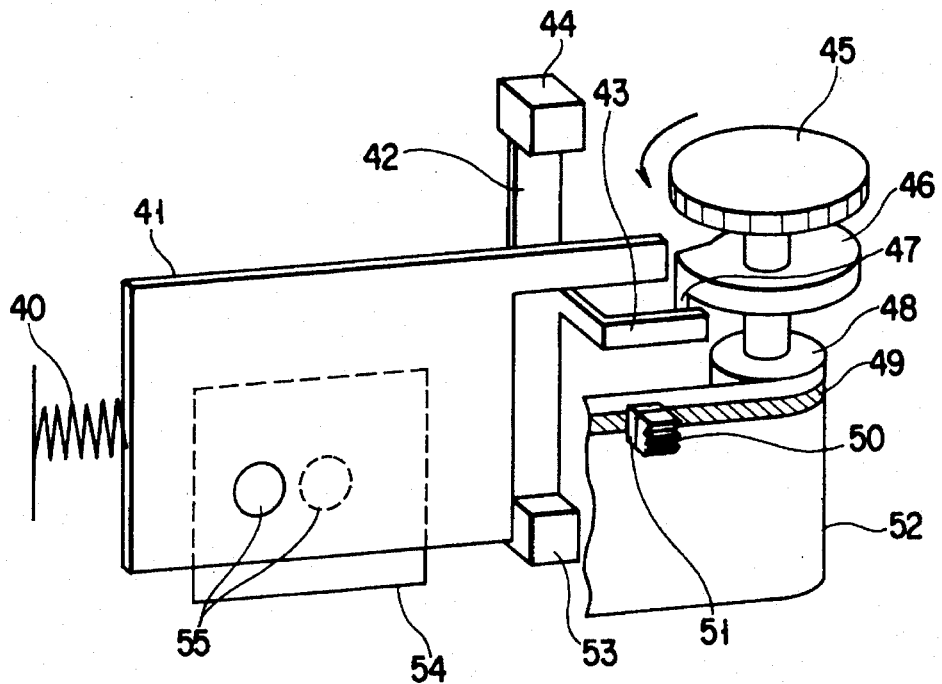
FIG. 12 is a perspective view showing a wind-up mechanism.

FIG. 12 shows a wind-up mechanism.

Figure 13:
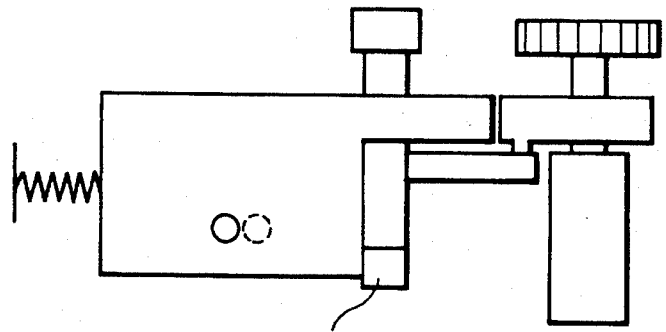
FIG. 13 is a view showing a state wherein a release plate 42 is brought into contact with a shutter stopper plate 43 to be stopped upon completion of a charging operation.

Referring to FIG. 12, a wind-up dial 45 has a cam 46 and a spool 48 coaxially mounted thereon. The cam 46 serves to charge a shutter 41. The spool 48 serves to wind up a film 52. When the wind-up dial 45 is rotated once in the direction indicated by the arrow (counterclockwise direction), the shutter 41 is pushed leftward, and the film 52 is wound up by one frame. With the presence of a wind-up stopper 47 arranged below the cam 46, once the film 52 is wound up by one frame, the next film wind-up operation is prohibited by a stopper plate 43 attached to a release plate 42 unless a release operation is performed. Although the shutter 41 is urged by a spring 40 rightward, i.e., in a direction to come into contact with the cam 46, the shutter 41 is brought into contact with the stopper plate 43 of the release plate 42 and stopped at the end of the charging operation. FIG. 13 shows this state.

Figure 14:
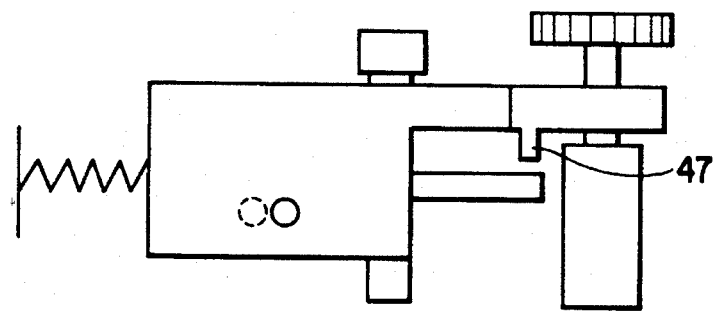
FIG. 14 is a view showing a state wherein a shutter stopper 53 comes off, and a shutter 41 travels when a release button 44 is depressed.

When a release button 44 is depressed, a shutter stopper 53 comes off, and the shutter 41 travels, as shown in FIG. 14. Since the shutter 41 has an aperture, the film 52 is exposed to object light through an aperture in a stationary plate during travel of the shutter 41. Furthermore, the stopper plate 43 comes off from the wound-up stopper 47 to allow the next film wind-up operation. When the film wind-up operation is performed, the state shown in FIG. 13 is restored. A trimming operation member 50 having a magnet 51 is disposed on the wind-up spool 48 side to perform erasure at a predetermined position on a magnetic track 49 on the film 52 upon a film wind-up operation after photography.

As described above, even with a simple manual wind-up mechanism using no motor, erasure/non-erasure of magnetic data can be performed with respect to photographed pictures in units of frames.

Note that the magnet 51 for erasure need not be in direct contact with the magnetic track 49 and may be arranged outside a light-shielding case (a camera housing) 56, as shown in FIG. 15. In this case, the case may be constituted by a member which allows penetration of magnetism, e.g., a plastic member, and a portion, of the member, which corresponds to the magnetic track 49 may be formed thin to allow erasure of magnetic data while keeping a light-shield effect. FIG. 16 shows a position to which the magnet 51 is caused to retreat by sliding the trimming operation member 50, at which position magnetic data is not erased.

The upper and lower surfaces of the trimming operation member 50 and the magnet 51 for erasure need not be directly coupled to each other. As shown in FIG. 17, the trimming operation member 50 may be slid/rotated about the center of a rotating shaft 57 to cause the magnet 51 to retreat from the magnetic track 49. FIG. 18 shows a position to which the magnet 51 is caused to retreat from the magnetic track 49 by sliding the trimming operation member 50 downward.

The structure and operation of the photographic printer will be described lastly.

Trimming to be performed by this photographic printer need not be based on a method of switching exposure lenses having different focal lengths and may be based on a method of using a zoom lens, as shown in FIG. 19. That is, as shown in FIG. 19, a zoom lens 62 for exposure can be set to an arbitrary focal length by a zoom motor 63. Therefore, by setting a focal length in accordance with trimming data read from the magnetic track 49, various trimming data can be handled.

Figure 20:
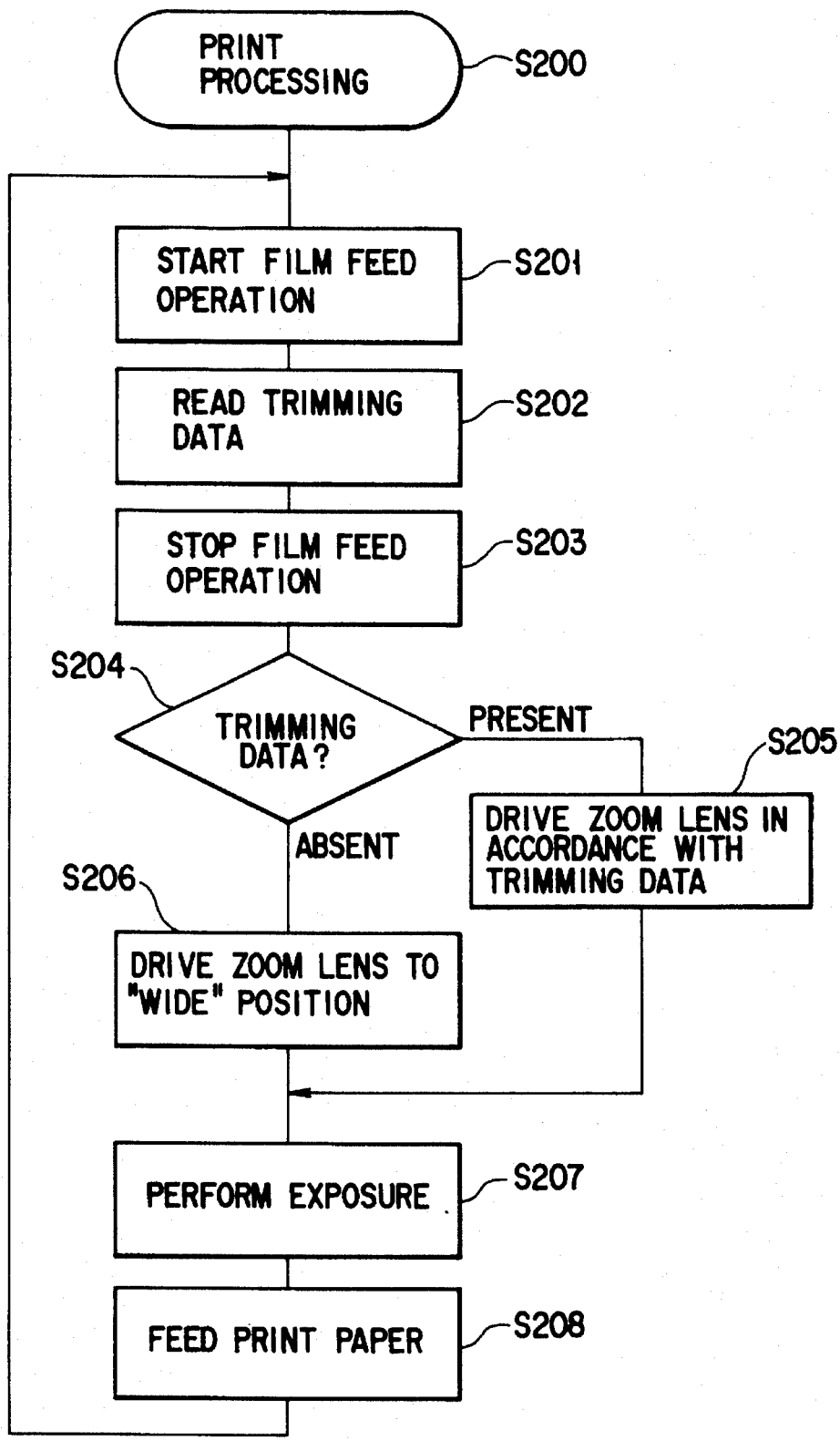
FIG. 20 is a flow chart showing an operation of a photographic printer.

An operation of the photographic printer will be described below with reference to the flow chart shown in FIG. 20.

Prior to exposure, a film feed motor 64 is driven to start feeding the film 52 (step S201). Trimming data on the magnetic track 49 is read (step S202), and the film feed operation is stopped when the film 52 is fed by one frame (step S203). The presence/absence of the trimming data is checked (step S204). If the trimming data is present, the flow advances to step S205 to drive the zoom lens 62 for exposure in accordance with the trimming data.

If no trimming data is present, the flow advances to step S206 to drive the zoom lens 62 to a "WIDE" position, i.e., a focal length position where the entire photographed frame region is exposed. In step S207, exposure is performed with respect to print paper 60. In step S208, the print paper 60 is fed by one frame. With this operation, even if the film 52 has different trimming data written therein in units of frames, or the respective films 52 have different trimming data, proper trimming exposure can be performed in accordance with the respective trimming data.

As has been described in detail above, according to the trimming camera of the present invention, when trimming data is magnetically recorded on a film, a trimming region switching lever having a magnet mounted on its distal end is set outside a track in the "TELE MODE" and is set above the track in the "WIDE MODE", thereby erasing trimming, as needed.

An erase head which is electrically turned on/off may be arranged at a position to oppose a track, instead of the above-mentioned magnet, so that trimming data can be erased, as needed, by turning off the erase head in the "TELE MODE" and turning on the erase head in the "WIDE MODE".

If a film having trimming data imprinted/recorded thereon is used, an LED may be arranged at a position to oppose a track so that trimming data can be erased, as needed, by turning off the LED in the "TELE MODE" and turning on the LED in the "WIDE MODE".

Since trimming regions can be switched with a very simple, inexpensive arrangement, a compact, inexpensive, high-performance trimming camera, such as a camera with a film having a telephoto/wide-angle switching function or a camera with a film having a panoramic/normal photography switching function, can be provided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A camera system including a camera main body and a film loaded therein, said film having a single magnetic recording track portion extending in a feed direction of said film, and wherein command data specifying a picture portion smaller than an entire frame of the picture, for commanding a printer apparatus to perform a trimming exposure operation is recorded on said single magnetic recording track portion of said film in advance, said camera system comprising:

a wind-up mechanism including a wind-up dial and a wind-up spool for winding up said film in accordance with a manual operation of said wind-up dial;

a manual operation member, arranged on a backface portion of a camera main body, said manual operation member being slidably movable in a direction perpendicular to the feed direction of said film;

permanent magnet means, provided in the camera main body such that the permanent magnet means is fixed to one end of said manual operation member, and is movable on a surface parallel to said film, for:

when trimming printing is undesired, erasing entire portions, corresponding to photographed frames, of the command data which was recorded in advance on said single magnetic recording track portion, by operating the manual operation member to locate the permanent magnet means at a first position where the permanent magnet means opposes the single magnetic recording track portion of the film and winding up said film by means of said wind-up mechanism, so that the command data for the corresponding photographed frames is erased and the entire frame of the picture will be printed, and when trimming printing is desired, preventing erasure of the command data corresponding to photographed frames, by operating the manual operation member to move said permanent magnet means to a second position at which said permanent magnet means is retreated and spaced apart from said single magnetic recording track portion, so that the command data of the photographed frames which was recorded in advance is not erased when the film is wound and only a picture portion smaller than the entire frame of the picture will be printed.

2. A camera according to claim 1, wherein said command data specifying a picture portion smaller than the entire frame of the picture comprises command data specifying a picture portion based on which a trimming exposure operation or panorama exposure operation is performed.

3. A camera using a film having a recording portion formed along a longitudinal direction thereof, wherein optical data is recorded on said recording portion in advance, comprising:

a light emitting element capable of erasing the optical data recorded on said recording portion; and switching means for switching between a first mode for designating a printing operation based on the optical data recorded in advance on said film recording portion, and a second mode for designating a printing operation different from the printing operation in the first mode, said switching means being arranged outside a main body of said camera and moving said light emitting element between a first position at which said light emitting element is retreated or spaced from said recording portion to prevent erasing of the optical data, and a second position where said light emitting element means opposes said optical recording portion to cause erasing of the optical data when in said second position, such that the printing operation designated in said second mode will be performed, in response to a switching operation of said switching means from one of the first and second modes to the other of said first and second modes.

4. A camera according to claim 3, wherein the first mode is a mode for enlarging and printing a predetermined region smaller than an entire frame of a picture.

5. A camera according to claim 3, wherein the first mode is a mode for printing a horizontally oblong region by using substantially one half of an entire frame of a picture.

6. A camera using a film having a magnetic recording portion on which data is recorded in advance, comprising:

a light-shielding case, said film being contained within said light-shielding case;

a permanent magnet capable of erasing the data recorded on said magnetic recording portion of said film, said permanent magnet being positioned outside of said light-shielding case such that said light-shielding case is interposed between said film and said permanent magnet;

switching means for switching between a special mode for designating a printing operation based on the data recorded on said magnetic recording portion of said film, and a normal mode for designating a normal printing operation, said switching means being arranged outside a main body of said camera and moving said permanent magnet between a first position at which said permanent magnet is retreated or spaced from said magnetic recording portion in a plane that is parallel to a face of said light-shielding case to prevent erasing of the data which was recorded in advance on said magnetic recording portion of said film, and a second position where said permanent magnet opposes said magnetic recording portion of said film to cause erasing of the magnetically recorded data when in said second position, such that the printing operation designated in said second mode will be performed, in response to a switching operation of said switching means from one of the normal mode and the special mode to the other of said normal and special modes of operation of said camera, thereby erasing the data during a winding operation of said film when said permanent magnet is at said second position where it opposes said magnetic recording portion of said film.

* * * * *